US011133727B2

United States Patent
Kinjo et al.

(10) Patent No.: US 11,133,727 B2
(45) Date of Patent: Sep. 28, 2021

(54) ELECTRIC ACTUATOR

(71) Applicant: NIDEC TOSOK CORPORATION, Kanagawa (JP)

(72) Inventors: Shuichi Kinjo, Kanagawa (JP); Hiroshi Shirai, Kanagawa (JP); Yutaka Uematsu, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 93 days.

(21) Appl. No.: 16/737,881

(22) Filed: Jan. 8, 2020

(65) Prior Publication Data
US 2020/0251958 A1 Aug. 6, 2020

(30) Foreign Application Priority Data

Jan. 31, 2019 (JP) .............................. JP2019-016459

(51) Int. Cl.
*H02K 7/116* (2006.01)
*H02K 7/08* (2006.01)
*H02K 7/00* (2006.01)

(52) U.S. Cl.
CPC ............. *H02K 7/116* (2013.01); *H02K 7/003* (2013.01); *H02K 7/088* (2013.01)

(58) Field of Classification Search
CPC ........ H02K 7/116; H02K 7/003; H02K 7/088; F16H 1/28
USPC ....................................................... 310/75 R
See application file for complete search history.

(56) References Cited

FOREIGN PATENT DOCUMENTS

JP 2013247798 12/2013

*Primary Examiner* — Terrance L Kenerly
(74) *Attorney, Agent, or Firm* — JCIPRNET

(57) ABSTRACT

An electric actuator includes a motor including a rotor having a motor shaft extending along a central axis and a stator, a deceleration mechanism connected to the motor shaft, an output shaft, a first bearing, a second bearing, and a deceleration mechanism case. The first bearing is fitted on an eccentric axis part of the motor shaft. The deceleration mechanism includes an internal gear in a ring shape, an external gear connected to the eccentric axis part, and an output flange part which transmits rotation of the external gear around the central axis to the output shaft. The deceleration mechanism case includes a case body and a cup member. The cup member includes a first cylinder part to which the internal gear is fitted on the radial-direction inner side, and a second cylinder part to which the second bearing is fitted on the radial-direction inner side.

10 Claims, 5 Drawing Sheets

ELECTRIC ACTUATOR

CROSS-REFERENCE TO RELATED APPLICATION

This application claims the priority benefit of Japan Patent Application No. 2019-016459, filed on Jan. 31, 2019. The entirety of the above-mentioned patent application is hereby incorporated by reference herein and made a part of this specification.

BACKGROUND

Technical Field

The disclosure relates to an electric actuator.

Description of Related Art

An electric actuator includes a motor having a motor shaft, a deceleration mechanism, and an output shaft. The rotary actuator of Patent Document 1 (Japanese Laid-open No. 2013-247798) includes an electric motor that rotates and drives an input shaft, an output shaft that outputs the rotational force of the electric motor to the shaft, and a decelerator that decelerates the rotation of the input shaft and transmits the rotation to the output shaft.

In Patent Document 1, there is a possibility that the ring gear of the decelerator and the output shaft are not disposed coaxially with each other. In this case, the transmission efficiency of the rotation transmitted from the input shaft to the output shaft via the decelerator decreases.

In view of the above circumstances, the disclosure provides an electric actuator that can stabilize and increase the transmission efficiency of rotation transmitted from a motor shaft to an output shaft via a deceleration mechanism.

SUMMARY

An aspect of an electric actuator of the disclosure includes a motor which includes a rotor having a motor shaft extending along a central axis and a stator facing the rotor in a radial direction; a deceleration mechanism which is disposed on one axial-direction side of the stator and connected to the motor shaft; an output shaft which is disposed on the one axial-direction side of the deceleration mechanism, which extends in an axial direction, to which rotation of the motor shaft is transmitted via the deceleration mechanism, and which rotates around the central axis; a first bearing which is attached to the motor shaft; a second bearing which is fitted on a radial-direction outer side of the output shaft; and a deceleration mechanism case in which a part of the motor shaft, the deceleration mechanism, a part of the output shaft, the first bearing and the second bearing are accommodated. The motor shaft includes an eccentric axis part with an eccentric axis, which is eccentric with respect to the central axis, as a center. The first bearing is fitted on the radial-direction outer side of the eccentric axis part. The deceleration mechanism includes an internal gear in a ring shape; an external gear which is connected to the eccentric axis part via the first bearing, which is disposed on a radial-direction inner side of the internal gear, and which engages with the internal gear; and an output flange part which is disposed on the one axial-direction side of the external gear, which is connected to the external gear, and which transmits rotation of the external gear around the central axis to the output shaft. The deceleration mechanism case includes a case body and a cup member which is a single member made of metal, which is fixed to the case body, and which is in a cylindrical shape with the central axis as a center. The cup member includes a first cylinder part to which the internal gear is fitted on the radial-direction inner side and a second cylinder part which is disposed on the one axial-direction side of the first cylinder part and to which the second bearing is fitted on the radial-direction inner side.

According to the electric actuator of an aspect of the disclosure, the transmission efficiency of the rotation transmitted from the motor shaft to the output shaft via the deceleration mechanism is stabilized and increased.

DESCRIPTION OF THE EMBODIMENTS

An electric actuator 10 according to an embodiment of the disclosure will be described with reference to the drawings. The Z-axis direction in each drawing is a vertical direction in which the positive side is the upper side and the negative side is the lower side. The axial direction of a central axis J1 appropriately shown in each drawing is parallel to the Z-axis direction, that is, the vertical direction. In the following description, a direction parallel to the axial direction of the central axis J1 is simply referred to as the "axial direction Z." Further, the X-axis direction and the Y-axis direction appropriately shown in each drawing are horizontal directions orthogonal to the axial direction Z and are directions orthogonal to each other. In the following description, a direction parallel to the X-axis direction is referred to as the "first direction X," and a direction parallel to the Y-axis direction is referred to as the "second direction Y."

Further, a radial direction with the central axis J1 as the center is simply referred to as the "radial direction," and a circumferential direction with the central axis J1 as the center is simply referred to as the "circumferential direction." In the embodiment, the upper side corresponds to one side in the axial direction, and the lower side corresponds to the other side in the axial direction. Further, the vertical direction, the horizontal direction, the upper side and the lower side are simply names for explaining the relative positional relationship of each part, and the actual dispositional relationship and the like may be a dispositional relationship and the like other than the dispositional relationship and the like indicated by these names.

Figure 1:
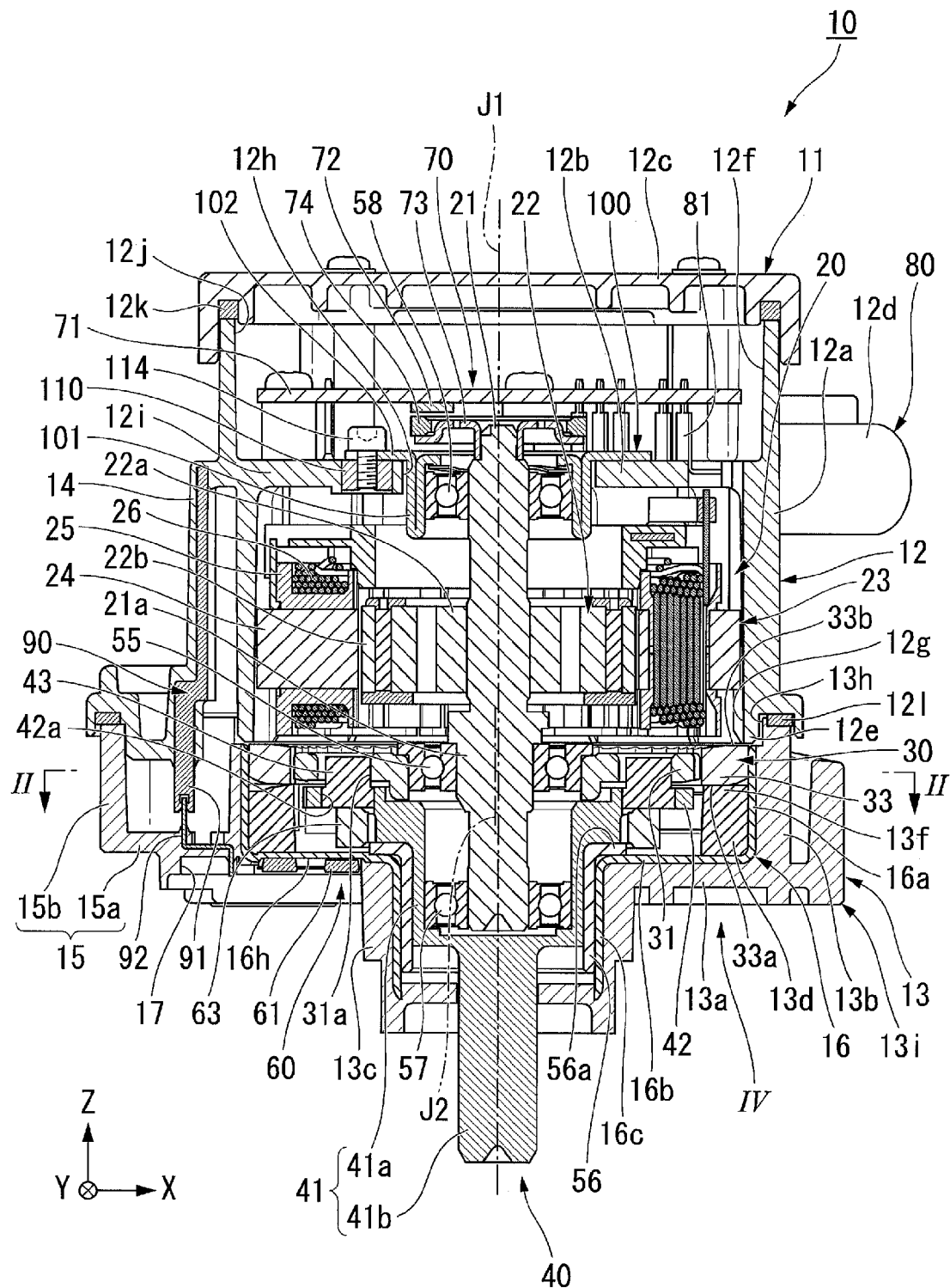
FIG. 1 is a longitudinal sectional view of an electric actuator of an embodiment.

As shown in FIG. 1, the electric actuator 10 of the embodiment includes a case 11, a bearing holder 100, a motor 20 having a motor shaft 21 extending along the central axis J1, a control part 70, a connector part 80, a deceleration mechanism 30, an output part 40, a wiring member 90, a rotation detection device 60, a first bearing (bearing) 55, a second bearing 56, a third bearing 57, and a fourth bearing 58. The first bearing 55, the third bearing 57, and the fourth bearing 58 are, for example, ball bearings. The second bearing 56 is a sliding bearing.

The case 11 accommodates the motor 20 and the deceleration mechanism 30. The case 11 includes a motor case 12 in which the motor 20 is accommodated and a deceleration mechanism case 13 in which the deceleration mechanism 30 is accommodated. That is, the electric actuator 10 includes the motor case 12 and the deceleration mechanism case 13. The motor case 12 includes an opening part 12g that opens on the lower side, and the deceleration mechanism case 13 includes an opening part 13h that opens on the upper side. The motor case 12 and the deceleration mechanism case 13 are fixed to each other in a state in which the opening part 12g and the opening part 13h face in the axial direction Z. In the state in which the motor case 12 and the deceleration mechanism case 13 are fixed to each other, the inner part of the opening part 12g and the inner part of the opening part 13h are connected to each other.

The motor case 12 is disposed on the upper side of the deceleration mechanism case 13 so as to cover the opening part 13h that opens on the upper side of the deceleration mechanism case 13. In the embodiment, the motor 20, the control part 70, the bearing holder 100, and the fourth bearing 58 are accommodated in the motor case 12.

The motor case 12 includes a case cylinder part 12a, a wall part 12b, a control board accommodating part 12f, a lid body 12c, a terminal holding part 12d, a gear pressing part 12e, and a first wiring holding part 14. Each part of the motor case 12 is made of resin except for a metal member 110 to be described later.

The case cylinder part 12a is in a cylindrical shape that extends in the axial direction Z with the central axis J1 as the center. The case cylinder part 12a opens on both sides in the axial direction Z. The case cylinder part 12a includes an opening part 12j that opens on the upper side and an opening part 12g that opens on the lower side. The case cylinder part 12a surrounds the radial-direction outer side of the motor 20. The case cylinder part 12a includes a first sealing member 12l that seals the opening part 13h that opens on the upper side of the deceleration mechanism case 13. The first sealing member 12l is in a ring shape and extends in the circumferential direction. The first sealing member 12l is located at the lower end part of the case cylinder part 12a and is disposed on a surface facing the lower side of the case cylinder part 12a.

The wall part 12b is in an annular plate shape that expands from the inner circumferential surface of the case cylinder part 12a toward the radial-direction inner side. The wall part 12b covers the upper side of a stator 23 (to be described later) of the motor 20. The wall part 12b includes a hole part 12h penetrating the wall part 12b in the axial direction Z. In the embodiment, the hole part 12h is in a circular shape with the central axis J1 as the center. The inner diameter of the hole part 12h is greater than the outer diameter of a holder cylinder part 101 to be described later. The wall part 12b includes a wall part body 12i made of resin and the metal member 110 made of metal. The wall part body 12i is part of the annular plate shape that expands from the inner circumferential surface of the case cylinder part 12a toward the radial-direction inner side.

The metal member 110 is in a circular cylindrical shape and has an internal thread part on its inner circumferential surface. The metal member 110 is, for example, a nut. The metal member 110 is embedded in the wall part body 12i. The metal member 110 is located at a position spaced apart from the radial-direction inner-side surface of the hole part 12h at the radial-direction outer side. A plurality of metal members 110 are provided. The plurality of metal members 110 are disposed at equal intervals all around along the circumferential direction. For example, three metal members 110 are provided.

The control board accommodating part 12f is a part for accommodating a control board 71 to be described later. The control board accommodating part 12f is configured on the radial-direction inner side of the upper-side part of the case cylinder part 12a. The bottom surface of the control board accommodating part 12f is the top surface of the wall part 12b. The control board accommodating part 12f opens on the upper side.

The lid body 12c is a lid in a plate shape that closes the upper-end opening of the control board accommodating part 12f. The lid body 12c includes a second sealing member 12k that seals the opening part 12j on the upper side of the case cylinder part 12a. The second sealing member 12k is in a ring shape and extends in the circumferential direction. The second sealing member 12k is located on the outer circumferential part of the lid body 12c and is disposed on a surface facing the lower side of the lid body 12c. The terminal holding part 12d protrudes from the case cylinder part 12a toward the radial-direction outer side. The terminal holding part 12d is in a cylindrical shape that opens on the radial-direction outer side. The terminal holding part 12d holds a terminal 81 to be described later.

Figure 4:
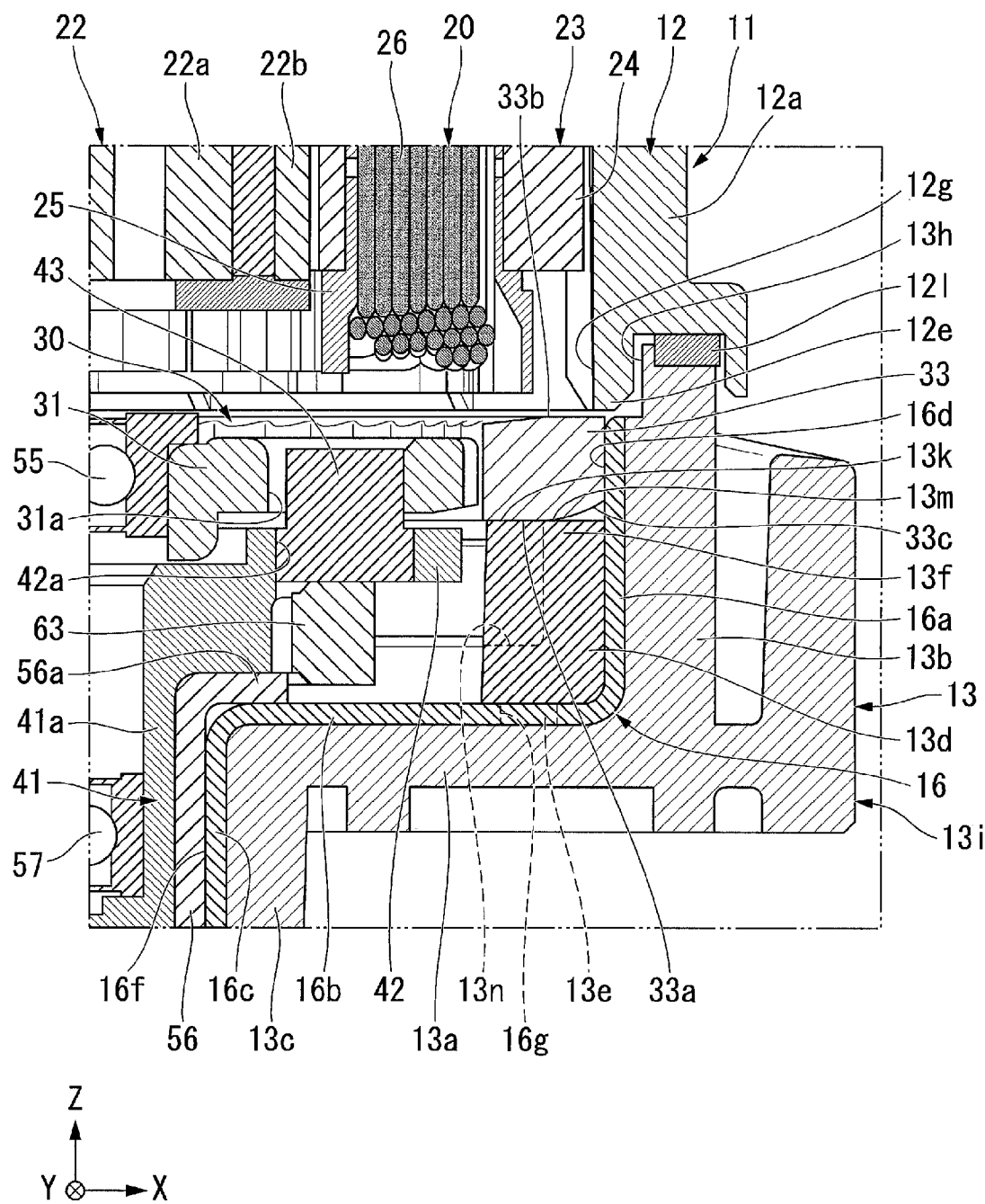
FIG. 4 is an enlarged longitudinal sectional view showing the part IV in FIG. 1.

As shown in FIGS. 1 and 4, the gear pressing part 12e is disposed on the lower end part of the case cylinder part 12a and protrudes toward the lower side. The gear pressing part 12e is in a ring shape with the central axis J1 as the center. The gear pressing part 12e is disposed on the upper side of an internal gear 33 (to be described later) of the deceleration mechanism 30. The gear pressing part 12e faces, with a gap therebetween, or contacts an end surface 33b of the internal gear 33 facing the upper side (that is, the top surface). In the embodiment, the gear pressing part 12e faces, with a gap therebetween, or contacts at least the radial-direction outer-side part of the internal gear 33 in the axial direction Z.

The first wiring holding part 14 protrudes from the case cylinder part 12a toward the radial-direction outer side. In FIG. 1, the first wiring holding part 14 protrudes from the case cylinder part 12a toward the negative side of the first direction X. The first wiring holding part 14 extends in the axial direction Z. The axial-direction position of the upper end part of the first wiring holding part 14 is substantially the same as the axial-direction position of the wall part 12b. The circumferential-direction position of the first wiring holding part 14 is, for example, different from the circumferential-direction position of the connector part 80.

The deceleration mechanism case 13 is disposed on the lower side of the motor case 12 so as to cover the opening part 12g that opens on the lower side of the motor case 12. In the embodiment, a part of the motor shaft 21, the deceleration mechanism 30, a part of an output shaft 41 (to be described later) of the output part 40, the first bearing 55 and the second bearing 56 are accommodated in the deceleration mechanism case 13. In addition, the third bearing 57 is also accommodated in the deceleration mechanism case 13.

Figure 5:
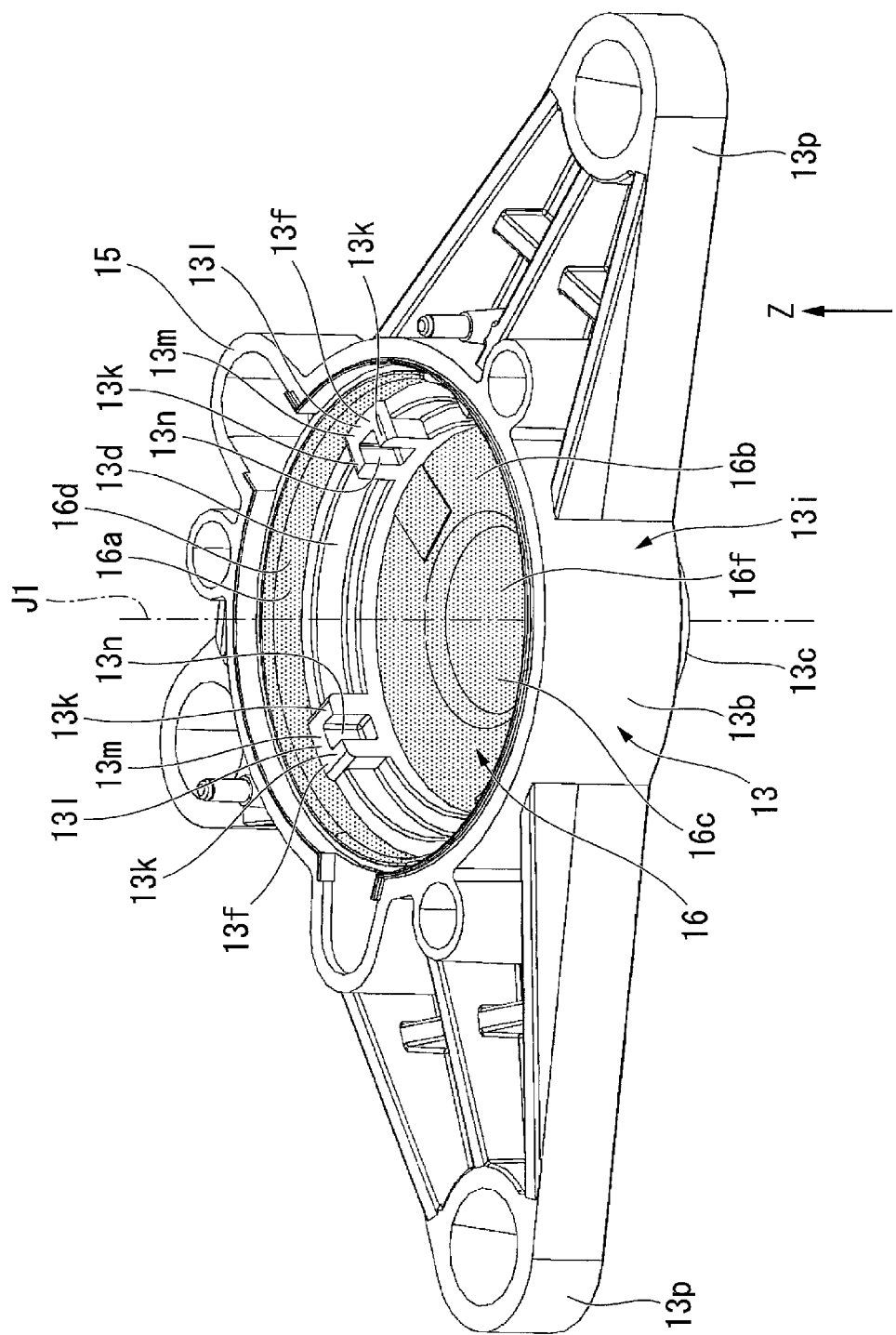
FIG. 5 is a perspective view showing a deceleration mechanism case.

The deceleration mechanism case 13 includes a case body 13i, a cup member 16, a first metal cylinder part 111, and a second metal cylinder part 112. The case body 13i is made of resin. The case body 13i is configured by a single member. As shown in FIGS. 1, 4 and 5, the case body 13i includes a bottom wall part 13a, a cylinder part 13b, a protruding cylinder part 13c, a supporting cylinder part 13d, a connecting part 13e, a plurality of gear supporting parts 13f, a second wiring holding part 15, and a leg part 13p. That is, the deceleration mechanism case 13 includes the plurality of gear supporting parts 13f.

The bottom wall part 13a is in an annular plate shape with the central axis J1 as the center. The bottom wall part 13a covers the lower side of the deceleration mechanism 30. The cylinder part 13b is in a circular cylindrical shape that protrudes from the radial-direction outer end part of the bottom wall part 13a toward the upper side. The cylinder part 13b opens on the upper side. The upper end part of the cylinder part 13b contacts the bottom surface of the first sealing member 12l. The upper end part of the cylinder part 13b is fixed to the lower end part of the case cylinder part 12a. The protruding cylinder part 13c is in a circular cylindrical shape that protrudes from the radial-direction inner edge part of the bottom wall part 13a toward the lower side. The protruding cylinder part 13c opens on both sides in the axial direction.

The supporting cylinder part 13d is in a circular cylindrical shape with the central axis J1 as the center. The supporting cylinder part 13d is disposed on the radial-direction inner side of the cylinder part 13b. The upper end of the supporting cylinder part 13d is located closer to the lower side than the upper end of the cylinder part 13b. The supporting cylinder part 13d is disposed on the upper side of the radial-direction outer-side part of the bottom wall part 13a.

The connecting part 13e connects the bottom wall part 13a and the supporting cylinder part 13d in the axial direction Z. The connecting part 13e is in a circular columnar shape that extends in the axial direction Z. The upper end of the connecting part 13e is connected to the bottom surface of the supporting cylinder part 13d. The lower end of the connecting part 13e is connected to the top surface of the bottom wall part 13a. The connecting part 13e is disposed in a connecting hole 16g (to be described later) of the cup member 16. A plurality of connecting parts 13e are provided at equal intervals in the circumferential direction.

The plurality of gear supporting parts 13f are provided on the supporting cylinder part 13d. That is, the plurality of gear supporting parts 13f are provided on the case body 13i. The upper end of the gear supporting part 13f is located closer to the upper side than the upper end of the supporting cylinder part 13d. The gear supporting part 13f includes a part that protrudes from the supporting cylinder part 13d toward the upper side. The gear supporting part 13f is disposed on the lower side of the internal gear 33 (to be described later) of the deceleration mechanism 30. The plurality of gear supporting parts 13f are disposed in the circumferential direction with intervals from one another. The plurality of gear supporting parts 13f support an end surface 33a of the internal gear 33 facing the lower side (that is, the bottom surface).

According to the embodiment, the plurality of gear supporting parts 13f provided on the deceleration mechanism case 13 support the end surface 33a of the internal gear 33 facing the lower side in the axial direction Z at a plurality of locations in the circumferential direction. Compared with a configuration different from the embodiment, such as a configuration in which the end surface 33a of the internal gear 33 is supported over the entire circumference in the circumferential direction, according to the embodiment, the material usage amount of the case body 13i of the deceleration mechanism case 13 can be reduced, and the positional shift of the gear supporting part 13f caused by the shrinkage (deformation) after the resin molding can be suppressed. Therefore, the inclination of the internal gear 33 in the deceleration mechanism case 13 can be suppressed, and the transmission efficiency of rotation transmitted from the motor shaft 21 to the output shaft 41 (to be described later) of the output part 40 via the deceleration mechanism 30 can be stabilized and increased.

The gear supporting part 13f contacts at least the radial-direction inner-side part of the internal gear 33 in the axial direction Z. In the embodiment, the internal gear 33 is a press punched product, and a tapered part 33c located on the upper side going along the radial-direction outer side is provided on the radial-direction outer end part of the end surface 33a of the internal gear 33 facing the lower side. Even in this case, since the gear supporting part 13f contacts the radial-direction inner-side part of the internal gear 33 in the axial direction Z, the internal gear 33 can be stably supported.

Three or more gear supporting parts 13f are disposed at equal intervals in the circumferential direction. According to the embodiment, the internal gear 33 can be supported more stably by the three or more gear supporting parts 13f arranged at equal pitches in the circumferential direction. Therefore, the inclination of the internal gear 33 can be further suppressed.

As shown in FIGS. 4 and 5, the gear supporting part 13f includes a pair of first supporting parts 13k, a second supporting part 13l, a thinned part 13n, and a supporting surface 13m. The pair of first supporting parts 13k extend in the radial direction and are spaced apart from each other in the circumferential direction. The first supporting part 13k contacts the end surface 33a of the internal gear 33 facing the lower side in the axial direction Z. The second supporting part 13l connects the radial-direction outer end parts of the pair of first supporting parts 13k to each other and extends in the circumferential direction. The second supporting part 13l contacts or faces, with a gap therebetween, the end surface 33a of the internal gear 33 facing the lower side in the axial direction Z. The thinned part 13n is a part in a concave shape that opens on the radial-direction inner-side surface and the top surface of the gear supporting part 13f. The thinned part 13n is located between the pair of first supporting parts 13k. The thinned part 13n is located on the radial-direction inner side of the second supporting part 13l.

According to the embodiment, in the gear supporting part 13f, the thinned part 13n in a recessed shape can be provided between the pair of first supporting parts 13k in the circumferential direction and on the inner side of the second supporting part 13l in the radial direction. In this way, the material usage amount of the gear supporting part 13f can be reduced, and the positional shift caused by the resin shrinkage of the gear supporting part 13f can be further suppressed.

The supporting surface 13m configures the top surface of the gear supporting part 13f. The supporting surface 13m is configured by the top surfaces of the pair of first supporting parts 13k and the top surface of the second supporting part 13l. The supporting surface 13m is in a substantially U shape that opens on the radial-direction inner side when viewed from the axial direction Z. The supporting surface 13m contacts the end surface 33a of the internal gear 33 facing the lower side. The supporting surface 13m is a plane perpendicular to the central axis J1.

According to the embodiment, since the gear supporting part 13f supports the end surface 33a of the internal gear 33 facing the lower side by the supporting surface 13m perpendicular to the central axis J1, the axial-direction position of the internal gear 33 is stabilized, and the inclination of the internal gear 33 is further suppressed.

In addition, in the embodiment, the gear pressing part 12e faces, with a gap therebetween, or contacts the end surface 33b of the internal gear 33 facing the upper side. That is, the internal gear 33 is disposed and interposed between the gear supporting part 13f and the gear pressing part 12e from both sides in the axial direction. In this way, the inclination of the internal gear 33 can be further suppressed.

In addition, in the embodiment, since the gear pressing part 12e is in a ring shape with the central axis J1 as the center, the internal gear 33 can be pressed from the axial direction Z over the entire circumferential direction. In this way, the inclination of the internal gear 33 can be further suppressed.

Figure 2:
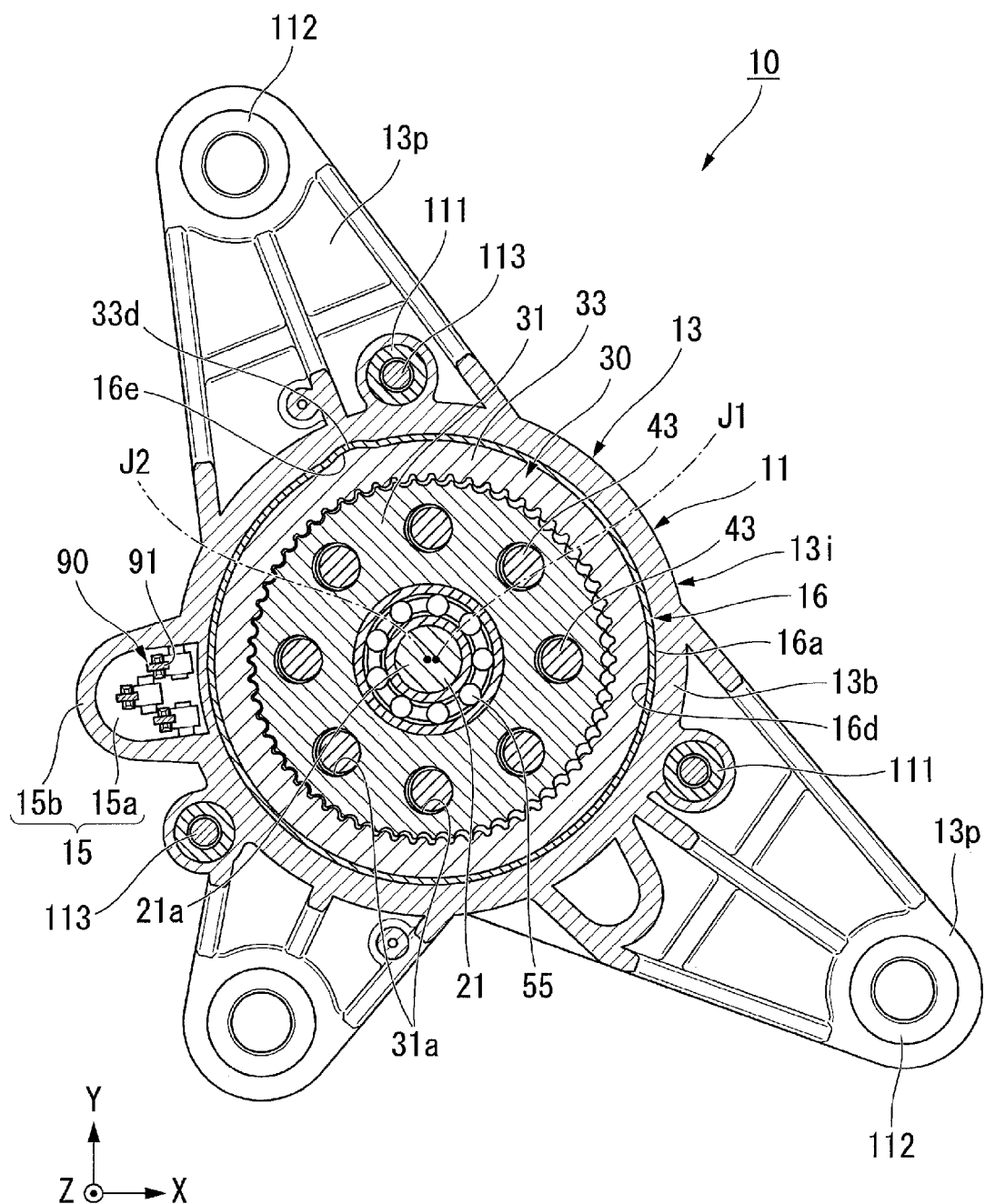
FIG. 2 is a transverse sectional view of the electric actuator of the embodiment showing the II-II section of FIG. 1.

As shown in FIGS. 1, 2, and 5, the second wiring holding part 15 protrudes from the cylinder part 13b toward the radial-direction outer side. In FIG. 1, the second wiring holding part 15 protrudes from the cylinder part 13b toward the negative side of the first direction X, that is, the same side as the side toward which the first wiring holding part 14 protrudes. The second wiring holding part 15 is disposed on the lower side of the first wiring holding part 14. The second wiring holding part 15 is, for example, in a box shape that is hollow and opens on the upper side. The inner part of the second wiring holding part 15 is connected to the inner part of the cylinder part 13b. The second wiring holding part 15 includes a bottom wall part 15a and a side wall part 15b. The bottom wall part 15a extends from the bottom wall part 13a toward the radial-direction outer side. In FIG. 1, the bottom wall part 15a extends from the bottom wall part 13a toward the negative side of the first direction X. The side wall part 15b extends from the outer edge part of the bottom wall part 15a toward the upper side. In the embodiment, the bottom part of the case body 13i is configured by the bottom wall part 13a and the bottom wall part 15a.

As shown in FIGS. 2, and 5, the leg part 13p extends from the outer circumferential surface of the cylinder part 13b toward the radial-direction outer side. A plurality of leg parts 13p are disposed on the outer circumferential surface of the cylinder part 13b in the circumferential direction with intervals from one another. In the embodiment, three leg parts 13p are disposed in the circumferential direction with unequal intervals from one another. The protruding lengths of the three leg parts 13p from the outer circumferential surface of the cylinder part 13b toward the radial-direction outer side are different from one another. The electric actuator 10 can be mounted on an object such as a vehicle or the like by the leg parts 13p.

As shown in FIGS. 1, 2, 4 and 5, the cup member 16 is in a cylindrical shape with the central axis J1 as the center. The cup member 16 is in a circular cylindrical shape that extends in the axial direction Z, and more specifically, in a multistage circular cylindrical shape that opens on both sides in the axial direction. The cup member 16 is a single member made of metal. In the embodiment, the cup member 16 is made of sheet metal. Therefore, the cup member 16 can be manufactured by press-processing a metal plate, and the manufacturing cost of the cup member 16 can be reduced. In the embodiment, the cup member 16 is made of a nonmagnetic material. The cup member 16 is fixed to the case body 13i.

When the case body 13i is manufactured by resin molding, a part of the cup member 16 is embedded in the case body 13i by insert molding. That is, a part of the cup member 16 is embedded in the case body 13i. According to the embodiment, the deceleration mechanism case 13 is easy to manufacture, and the positional accuracy between the case body 13i and the cup member 16 is stably ensured.

The cup member 16 includes a first cylinder part 16a, a second cylinder part 16c, and a ring plate part 16b. The first cylinder part 16a is in a circular cylindrical shape that extends in the axial direction Z with the central axis J1 as the center. The diameter of the first cylinder part 16a is greater than the diameter of the second cylinder part 16c. The outer circumferential surface of the first cylinder part 16a contacts the inner circumferential surface of the cylinder part 13b. The lower-side part on the inner circumferential surface of the first cylinder part 16a contacts the outer circumferential surface of the supporting cylinder part 13d. The lower-side part of the first cylinder part 16a is embedded between the cylinder part 13b and the supporting cylinder part 13d of the case body 13i.

The internal gear 33 is fitted to the first cylinder part 16a on the radial-direction inner side. Specifically, the first cylinder part 16a includes, on the inner circumferential surface of the first cylinder part 16a, a first fitting part 16d which is exposed to the radial-direction inner side and to which the internal gear 33 is fitted. The first fitting part 16d is located on the upper-side part of the inner circumferential surface of the first cylinder part 16a and is exposed to the inner part of the deceleration mechanism case 13. According to the embodiment, since the diameter of the first cylinder part 16a is greater than the diameter of the second cylinder part 16c, the deceleration ratio of the deceleration mechanism 30 can be increased by increasing the diameter of the internal gear 33 fitted in the first cylinder part 16a.

As shown in FIG. 2, the first cylinder part 16a includes a concave part 16e. The concave part 16e is recessed from the inner circumferential surface of the first cylinder part 16a toward the radial-direction outer side. In the transverse sectional view perpendicular to the central axis J1 shown in FIG. 2, the concave part 16e is in a concave curve shape.

As shown in FIGS. 1, 4 and 5, the second cylinder part 16c is in a circular cylindrical shape that extends in the axial direction Z with the central axis J1 as the center. The second cylinder part 16c is disposed on the lower side of the first cylinder part 16a. The outer circumferential surface of the second cylinder part 16c contacts the inner circumferential surface of the protruding cylinder part 13c. The lower end part of the second cylinder part 16c is embedded in the inner part of the protruding cylinder part 13c of the case body 13i.

The second bearing 56 is fitted to the second cylinder part 16c on the radial-direction inner side. The second bearing 56 includes, on the upper end part of the second bearing 56, a bush flange part 56a that protrudes to the radial-direction outer side. The bush flange part 56a contacts the top surface of the ring plate part 16b. In this way, the second bearing 56 can be suppressed from detaching from the inner part of the second cylinder part 16c toward the lower side.

According to the embodiment, in the cup member 16 that is a single member made of metal, the internal gear 33 is fitted in the first cylinder part 16a, and the second bearing 56 is fitted in the second cylinder part 16c. In this way, the output shaft 41 (to be described later) of the output part 40 fitted in the second bearing 56 and the internal gear 33 are disposed coaxially with each other. Therefore, the transmission efficiency of the rotation transmitted from the motor shaft 21 to the output shaft 41 via the deceleration mechanism 30 is stabilized and increased.

The second cylinder part 16c includes, on the inner circumferential surface of the second cylinder part 16c, a second fitting part 16f which is exposed to the radial-direction inner side and to which the second bearing 56 is fitted. The second fitting part 16f is located on a part of the inner circumferential surface of the second cylinder part 16c other than the lower end part and is exposed to the inner part of the deceleration mechanism case 13. According to the embodiment, the internal gear 33 is directly fitted to the first fitting part 16*d* that is on the inner circumferential surface of the first cylinder part 16*a* and exposed to the radial-direction inner side, and the second bearing 56 is directly fitted to the second fitting part 16*f* that is on the inner circumferential surface of the second cylinder part 16*c* and exposed to the radial-direction inner side. Therefore, by embedding a part of the cup member 16 in the case body 13*i* and fixing them to each other, the coaxial degree of the internal gear 33 and the output shaft 41 is stably ensured.

The ring plate part 16*b* is in an annular plate shape with the central axis J1 as the center. The ring plate part 16*b* includes a pair of plate surfaces facing the axial direction Z. The ring plate part 16*b* is connected to the lower-side end part of the first cylinder part 16*a* and the upper-side end part of the second cylinder part 16*c*. The outer edge part of the ring plate part 16*b* is connected to the lower end part of the first cylinder part 16*a*, and the inner edge part of the ring plate part 16*b* is connected to the upper end part of the second cylinder part 16*c*. The bottom surface of the ring plate part 16*b* contacts the top surface of the bottom wall part 13*a*. The radial-direction outer end part of the ring plate part 16*b* is embedded between the bottom wall part 13*a* and the supporting cylinder part 13*d* of the case body 13*i*. The top surface of the ring plate part 16*b* is in a planar shape perpendicular to the central axis J1. A part of the top surface of the ring plate part 16*b* other than the radial-direction outer end part is exposed to the inner part of the deceleration mechanism case 13. The ring plate part 16*b* covers the lower side of a first magnet 63 (to be described later) of the rotation detection device 60.

The ring plate part 16*b* includes the connecting hole 16*g* and a recessed part 16*h*. As shown in FIG. 4, the connecting hole 16*g* penetrates the ring plate part 16*b* in the axial direction Z. The connecting hole 16*g* is, for example, a circular hole. The connecting hole 16*g* is disposed in the radial-direction outer end part of the ring plate part 16*b*. A plurality of connecting holes 16*g* are disposed in the ring plate part 16*b* in the circumferential direction with intervals from one another. In the embodiment, three or more connecting holes 16*g* are provided at equal intervals along the circumferential direction. The connecting part 13*e* of the case body 13*i* is disposed in the connecting hole 16*g*. That is, a part of the case body 13*i* is disposed in the connecting hole 16*g*. According to the embodiment, when the case body 13*i* is insert-molded together with the cup member 16, a part of the melted resin is filled into the connecting hole 16*g* of the ring plate part 16*b* and cures. Therefore, the case body 13*i* and the cup member 16 are more stably fixed.

As shown in FIG. 1, the recessed part 16*h* is recessed from the bottom surface of the ring plate part 16*b* toward the upper side. That is, the recessed part 16*h* is recessed from the plate surface of the ring plate part 16*b* in the axial direction Z. In the embodiment, a first rotation sensor 61 (to be described later) of the rotation detection device 60 is disposed in the recessed part 16*h*. According to the embodiment, since the thickness of the part of the ring plate part 16*b* where the recessed part 16*h* is located can be made thinner than the thickness of the part where the recessed part 16*h* is not located, when the first magnet 63 and the first rotation sensor 61 are located on both sides of the ring plate part 16*b* in the axial direction as in the embodiment, the detection accuracy of the first rotation sensor 61 can be increased. Though not particularly shown in the drawings, a configuration member other than the first rotation sensor 61 may be disposed in the recessed part 16*h*. In this case, for example, the size of the deceleration mechanism case 13 in the axial direction Z can be kept small.

As shown in FIG. 2, the first metal cylinder part 111 is disposed at the outer circumferential part of the cylinder part 13*b*, and is held by the case body 13*i*. A plurality of first metal cylinder parts 111 are provided in the circumferential direction with intervals from one another. The first metal cylinder part 111 is a cylinder made of metal and extending in the axial direction Z, and has an internal thread part on its inner circumferential surface. An external thread part of a bolt member 113 for fixing the motor case 12 and the deceleration mechanism case 13 is screwed into the internal thread part of the first metal cylinder part 111. The first metal cylinder part 111 is used as an insertion component when the case body 13*i* is manufactured by resin molding, and is fixed to the case body 13*i*.

The second metal cylinder part 112 is each disposed in the radial-direction outer end part of the plurality of leg parts 13*p*. That is, a plurality of second metal cylinder parts 112 are provided. The second metal cylinder part 112 is a cylinder made of metal and extending in the axial direction Z. A bolt member or the like (not shown) for fixing the electric actuator 10 to an object such as a vehicle or the like is inserted into the second metal cylinder part 112. The second metal cylinder part 112 is used as an insertion component when the case body 13*i* is manufactured by resin molding, and is fixed to the case body 13*i*.

As shown in FIG. 1, the case 11 includes a concavity 17 located on the outer surface of the case 11. In the embodiment, the concavity 17 is provided in the deceleration mechanism case 13. More specifically, the concavity 17 is recessed from the bottom surface of the bottom part of the case body 13*i* toward the upper side. In the embodiment, the concavity 17 is disposed across the bottom wall part 13*a* and the bottom wall part 15*a*. The concavity 17 extends in the radial direction. In the embodiment, the direction in which the concavity 17 extends is a direction parallel to the first direction X in the radial direction.

The bearing holder 100 is fixed to the motor case 12. The bearing holder 100 is made of metal. In the embodiment, the bearing holder 100 is made of sheet metal. Therefore, the bearing holder 100 can be manufactured by press-processing a metal plate, and the manufacturing cost of the bearing holder 100 can be reduced. The bearing holder 100 includes a holder cylinder part 101 in a cylindrical shape and a holder flange part 102. In the embodiment, the holder cylinder part 101 is in a circular cylindrical shape with the central axis J1 as the center. The holder cylinder part 101 holds the fourth bearing 58 on the radial-direction inner side. The holder cylinder part 101 is inserted into the hole part 12*h*. The holder cylinder part 101 protrudes from the inner part of the control board accommodating part 12*f* to the lower side lower than the wall part 12*b* via the hole part 12*h*.

The outer diameter of the holder cylinder part 101 is smaller than the inner diameter of the hole part 12*h*. Therefore, at least a part of the radial-direction outer-side surface of the holder cylinder part 101 in the circumferential direction is located at a position spaced apart from the radial-direction inner-side surface of the hole part 12*h* at the radial-direction inner side. In the example shown in FIG. 1, the radial-direction outer-side surface of the holder cylinder part 101 is located spaced apart from the radial-direction inner-side surface of the hole part 12*h* at the radial-direction inner side along the entire circumference. The position of the holder cylinder part 101 can be adjusted within a predetermined range in a direction orthogonal to the central axis J1 in the hole part 12h.

The holder flange part 102 extends from the holder cylinder part 101 toward the radial-direction outer side. In the embodiment, the holder flange part 102 expands from the upper-side end part of the holder cylinder part 101 toward the radial-direction outer side. The holder flange part 102 is in an annular plate shape with the central axis J1 as the center. The holder flange part 102 is located on the upper side of the wall part 12b. The holder flange part 102 is fixed to the wall part 12b. In this way, the bearing holder 100 is fixed to the motor case 12.

In the embodiment, the holder flange part 102 is fixed to the wall part 12b by a plurality of screw members 114 that are fastened to the wall part 12b in the axial direction Z. In the embodiment, the screw members 114 for fixing the holder flange part 102 are fastened to the internal thread parts of the metal members 110 in the wall part 12b. For example, three or more screw members 114 for fixing the holder flange part 102 are provided in the circumferential direction with intervals from one another.

The motor 20 includes a rotor 22 having the motor shaft 21 and a stator 23. The rotor 22 includes a rotor core 22a in a circular cylindrical shape fixed to the outer circumferential surface of the motor shaft 21 and includes a magnet 22b fixed to the rotor core 22a. The motor shaft 21 rotates with the central axis J1 as the center. The motor shaft 21 is supported by the fourth bearing 58 and the third bearing 57 to be rotatable around the central axis J1. The fourth bearing 58 is held by the bearing holder 100 and supports a part of the motor shaft 21 above the rotor core 22a to be rotatable. The third bearing 57 supports a part of the motor shaft 21 below the rotor core 22a to be rotatable. The third bearing 57 is fitted on the radial-direction outer side of the lower-side end part of the motor shaft 21.

The upper end part of the motor shaft 21 protrudes closer to the upper side than the wall part 12b through the hole part 12h. The motor shaft 21 includes an eccentric axis part 21a with an eccentric axis J2, which is eccentric with respect to the central axis J1, as the center. The eccentric axis part 21a is located below the rotor core 22a. The inner ring of the first bearing 55 is fitted and fixed to the eccentric axis part 21a. The first bearing 55 is fitted on the radial-direction outer side of the eccentric axis part 21a. In this way, the first bearing 55 is attached to the motor shaft 21. The motor shaft 21 is connected to the deceleration mechanism 30 via the first bearing 55. That is, the eccentric axis part 21a is connected to the deceleration mechanism 30.

Figure 3:
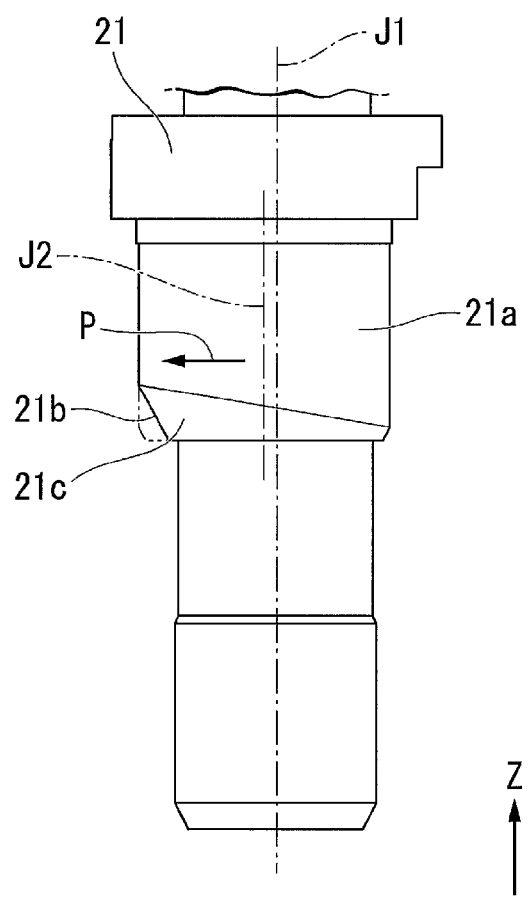
FIG. 3 is a side view showing the vicinity of an eccentric axis part of a motor shaft.

As shown in FIG. 3, the eccentric axis part 21a includes a balance concave part 21b and a tapered surface part 21c. The balance concave part 21b is disposed on an end part of the eccentric axis part 21a in a predetermined direction P which goes in the radial direction from the central axis J1 toward the eccentric axis J2, and the balance concave part 21b is recessed from the outer surface of the eccentric axis part 21a. That is, the balance concave part 21b is disposed on an end part of the eccentric axis part 21a in the predetermined direction P where the distance from the central axis J1 is the longest in the radial direction. In the embodiment, the balance concave part 21b is disposed on the lower-side part of the eccentric axis part 21a.

Compared with an eccentric axis part 21a which is different from the embodiment and in which the balance concave part 21b is not provided, since the eccentric axis part 21a in which the balance concave part 21b is provided as in the embodiment has a center of gravity disposed near the central axis J1, the variation in centrifugal force when the eccentric axis part 21a rotates with the central axis J1 as the center is suppressed to be small. Since the eccentric axis part 21a can suppress the variation in centrifugal force by itself, a separate member such as a balancer or the like becomes unnecessary, and the number of components can be reduced. According to the embodiment, the rotation balance of the eccentric axis part 21a can be improved with a simple structure. Further, the transmission efficiency of the rotation transmitted from the motor shaft 21 to the output shaft 41 (to be described later) of the output part 40 via the deceleration mechanism 30 is stabilized and increased.

The tapered surface part 21c is disposed on the lower-side end part of the eccentric axis part 21a. The tapered surface part 21c is a tapered surface located on the radial-direction inner side going along the lower side. That is, the tapered surface part 21c is disposed on the end part of the eccentric axis part 21a in the axial direction Z, and is located on the radial-direction inner side going along the axial direction Z. In the tapered surface part 21c, the size in the axial direction Z of the end part in the predetermined direction P is greater than the size in the axial direction Z of the part other than the end part in the predetermined direction P. That is, the size in the axial direction Z of the tapered surface part 21c is maximal at the end part in the predetermined direction P of the eccentric axis part 21a. In addition, the balance concave part 21b is disposed on the end part in the predetermined direction P of the tapered surface part 21c. According to the embodiment, since in the eccentric axis part 21a, the balance concave part 21b is provided on the end part in the predetermined direction P of the tapered surface part 21c, the function of the balance concave part 21b can be added to the tapered surface part 21c. Therefore, the rotational balance of the eccentric axis part 21a can be improved with a simpler structure.

As shown in FIG. 1, the stator 23 faces the rotor 22 in the radial direction. The stator 23 surrounds the rotor 22 on the radial-direction outer side of the rotor 22, and faces the outer circumferential surface of the rotor 22 with a gap therebetween in the radial direction. The stator 23 includes a stator core 24 in a ring shape that surrounds the radial-direction outer side of the rotor 22, an insulator 25 attached to the stator core 24, and a plurality of coils 26 attached to the stator core 24 via the insulator 25. The stator core 24 is fixed to the inner circumferential surface of the case cylinder part 12a. In this way, the motor 20 is held by the motor case 12.

The control part 70 includes the control board 71, an attachment member 73, a second magnet 74, and a second rotation sensor 72. The control board 71 is in a plate shape that expands in a direction perpendicular to the central axis J1, and includes a pair of plate surfaces facing the axial direction Z. The control board 71 is accommodated in the motor case 12. More specifically, the control board 71 is accommodated in the control board accommodating part 12f and is disposed spaced apart from the wall part 12b at the upper side. The control board 71 is a board electrically connected to the motor 20. The coils 26 of the stator 23 are electrically connected to the control board 71. The control board 71, for example, controls the current supplied to the motor 20. That is, an inverter circuit is mounted on the control board 71, for example.

The attachment member 73 is in a ring shape with the central axis J1 as the center. The inner circumferential surface of the attachment member 73 is fixed to the upper end part of the motor shaft 21. The attachment member 73 is disposed on the upper side of the fourth bearing 58 and the bearing holder 100. The attachment member 73 is, for example, a nonmagnetic material. Further, the attachment member 73 may be a magnetic material.

The second magnet 74 is in an annular shape with the central axis J1 as the center. The second magnet 74 is fixed to the top surface of the radial-direction outer edge part of the attachment member 73. The method of fixing the second magnet 74 to the attachment member 73 is not particularly limited, and is, for example, adhesion using an adhesive. The attachment member 73 and the second magnet 74 rotate together with the motor shaft 21. The second magnet 74 is disposed on the upper side of the fourth bearing 58 and the holder cylinder part 101. The second magnet 74 has N poles and S poles alternately disposed along the circumferential direction.

The second rotation sensor 72 is a sensor that detects the rotation of the motor 20. The second rotation sensor 72 is attached to the bottom surface of the control board 71. The second rotation sensor 72 faces the second magnet 74 in the axial direction Z with a gap therebetween. The second rotation sensor 72 detects the magnetic field generated by the second magnet 74. The second rotation sensor 72 is, for example, a Hall element. Though omitted in the drawings, a plurality of (three, for example) second rotation sensors 72 are provided along the circumferential direction. The second rotation sensor 72 can detect the rotation of the motor shaft 21 by detecting the change of the magnetic field generated by the second magnet 74 rotating together with the motor shaft 21.

The connector part 80 is a part where connection with electrical wiring outside the case 11 is performed. The connector part 80 is provided on the motor case 12. The connector part 80 includes the terminal holding part 12d described above and the terminal 81. The terminal 81 is embedded in and held by the terminal holding part 12d. One end of the terminal 81 is fixed to the control board 71. The other end of the terminal 81 is exposed to the outside of the case 11 through the inner part of the terminal holding part 12d. In the embodiment, the terminal 81 is, for example, a bus bar.

An external power supply (not shown) is connected to the connector part 80. More specifically, the external power supply is attached to the terminal holding part 12d, and the electrical wiring of the external power supply is electrically connected to the part of the terminal 81 protruding into the terminal holding part 12d. In this way, the terminal 81 electrically connects the control board 71 and the electrical wiring. Therefore, in the embodiment, power is supplied from the external power supply to the coils 26 of the stator 23 via the terminal 81 and the control board 71.

The deceleration mechanism 30 is disposed on the radial-direction outer side of the lower-side part of the motor shaft 21. The deceleration mechanism 30 is disposed on the lower side of the stator 23 and is connected to the motor shaft 21. The deceleration mechanism 30 is disposed between the bottom wall part 13a as well as the ring plate part 16b and the motor 20 in the axial direction Z. The deceleration mechanism 30 includes an external gear 31, the internal gear 33, and an output flange part 42.

The external gear 31 is in a substantially annular plate shape that expands in a plane orthogonal to the axial direction Z with the eccentric axis J2 of the eccentric axis part 21a as the center. The external gear 31 engages with the internal gear 33. A gear part is provided on the radial-direction outer-side surface of the external gear 31. The external gear 31 is connected to the eccentric axis part 21a via the first bearing 55. In this way, the deceleration mechanism 30 is connected to the lower-side part of the motor shaft

21. The external gear 31 is fitted to the outer ring of the first bearing 55 from the radial-direction outer side. In this way, the first bearing 55 connects the motor shaft 21 and the external gear 31 to be relatively rotatably with the eccentric axis J2 as the center.

As shown in FIGS. 1, 2, and 4, the external gear 31 includes a through hole 31a that penetrates the external gear 31 in the axial direction Z. A plurality of through holes 31a are disposed in the circumferential direction with intervals from one another. More specifically, the plurality of through holes 31a are disposed at equal intervals all around along the circumferential direction with the eccentric axis J2 as the center. For example, eight through holes 31a are provided.

The internal gear 33 is in a ring shape with the central axis J1 as the center. The internal gear 33 is in a substantially annular plate shape. In the embodiment, the internal gear 33 is a press-processed product. The internal gear 33 surrounds the radial-direction outer side of the external gear 31. That is, the external gear 31 is disposed on the radial-direction inner side of the internal gear 33. The internal gear 33 is located on the radial-direction inner side of the upper end part of the cup member 16. The internal gear 33 is fixed to the inner circumferential surface of the cup member 16. In the embodiment, the internal gear 33 is fixed to the inner circumferential surface of the first cylinder part 16a by press fitting. The outer circumferential surface of the internal gear 33 contacts the first fitting part 16d. In this way, the deceleration mechanism 30 is fixed to the inner circumferential surface of the cup member 16 and held by the deceleration mechanism case 13. A gear part is provided on the inner circumferential surface of the internal gear 33. The gear part of the internal gear 33 engages with the gear part of the external gear 31. More specifically, the gear part of the internal gear 33 engages with a part of the gear part of the external gear 31 in the circumferential direction.

As shown in FIG. 2, the internal gear 33 includes a convex part 33d. The convex part 33d protrudes from the outer circumferential surface of the internal gear 33 toward the radial-direction outer side and is disposed in the concave part 16e of the cup member 16. In the transverse sectional view perpendicular to the central axis J1 shown in FIG. 2, the convex part 33d is in a convex curve shape. According to the embodiment, the convex part 33d of the internal gear 33 is disposed in the concave part 16e of the cup member 16, whereby the relative rotational movement of the cup member 16 and the internal gear 33 around the central axis J1 is suppressed. Therefore, the function of the deceleration mechanism 30 is stabilized.

As shown in FIGS. 1 and 4, the output flange part 42 is disposed on the lower side of the external gear 31 and connected to the external gear 31, and the output flange part 42 transmits the rotation of the external gear 31 around the central axis J1 to the output shaft 41 (to be described later) of the output part 40. The output flange part 42 is in an annular plate shape that expands in the radial direction with the central axis J1 as the center. The output flange part 42 expands from the upper-side end part of the output shaft 41 toward the radial-direction outer side. The output flange part 42 contacts the bush flange part 56a of the second bearing 56 from the upper side.

The output flange part 42 includes a through hole 42a that penetrates the output flange part 42 in the axial direction Z. A plurality of through holes 42a are disposed in the circumferential direction with intervals from one another. More specifically, the plurality of through holes 42a are disposed at equal intervals all around along the circumferential direction with the central axis J1 as the center. For example, eight through holes 42a are provided.

A column member 43 is each inserted into each through hole 42a of the output flange part 42. That is, a plurality of column members 43 are provided. The column member 43 is in a member in a circular columnar shape that extends in the axial direction Z. The column member 43 is fixed to the output flange part 42 by press fitting, adhesion, screw fastening, or the like. The column member 43 protrudes from the top surface of the output flange part 42 toward the upper side. The plurality of column members 43 are disposed in the circumferential direction with intervals from one another. More specifically, the plurality of column members 43 are disposed at equal intervals all around along the circumferential direction with the central axis J1 as the center. The column members 43 are provided in the same number as the through holes 42a. In the embodiment, for example, eight column members 43 are provided.

As shown in FIG. 2, the column members 43 extend from the output flange part 42 toward the upper side and are inserted into each of the plurality of through holes 31a of the external gear 31. The diameter of the through hole 31a is greater than the diameter of the column member 43. The column member 43 disposed in the through hole 31a is capable of relative circular movement along the inner circumferential surface of the through hole 31a. With this configuration, the external gear 31 is swingable around the central axis J1.

The output part 40 is a part that outputs the driving force of the electric actuator 10. As shown in FIG. 1, the output part 40 includes a part that is accommodated in the deceleration mechanism case 13. The output part 40 includes the output shaft 41 and the output flange part 42. That is, the electric actuator 10 includes the output shaft 41. In the embodiment, the output part 40 is a single member.

The output shaft 41 is disposed on the lower side of the deceleration mechanism 30 and extends in the axial direction Z. The output shaft 41 rotates around the central axis J1 when the rotation of the motor shaft 21 is transmitted via the deceleration mechanism 30. The second bearing 56 is fitted on the radial-direction outer side of the output shaft 41. The output shaft 41 includes an output cylinder part 41a and an output shaft part 41b.

The output cylinder part 41a is connected to the output flange part 42 and is in a cylindrical shape extending in the axial direction Z. The output cylinder part 41a is in a circular cylindrical shape that extends from the inner edge of the output flange part 42 toward the lower side. The output cylinder part 41a is in a circular cylindrical shape that has a bottom part and opens on the upper side. The output cylinder part 41a is fitted to the radial-direction inner side of the second bearing 56. In the output cylinder part 41a, the third bearing 57 is fitted to the radial-direction inner side of the output cylinder part 41a.

According to the embodiment, the third bearing 57 is fitted in the output cylinder part 41a of the output shaft 41, and the lower-side end part of the motor shaft 21 is fitted in the third bearing 57. That is, since the output shaft 41 and the motor shaft 21 are disposed coaxially via the third bearing 57, the motor shaft 21, the output shaft 41, and the internal gear 33 are disposed coaxially with one another. Specifically, the output shaft 41 is rotatably supported by the cup member 16 via the second bearing 56. As described above, the internal gear 33 of the deceleration mechanism 30 is fixed to the cup member 16. Therefore, the deceleration mechanism 30 and the output shaft 41 can be supported together by the cup member 16 made of metal. In this way, the deceleration mechanism 30 and the output shaft 41 can be disposed with good axial accuracy. Therefore, the transmission efficiency of the rotation transmitted from the motor shaft 21 to the output shaft 41 via the deceleration mechanism 30 can be further stabilized and increased.

The output shaft part 41b extends from the output cylinder part 41a toward the lower side. The output shaft part 41b is in a columnar shape that extends from the bottom part of the output cylinder part 41a toward the lower side. In the embodiment, the output shaft part 41b is in a substantially circular columnar shape with the central axis J1 as the center. The outer diameter of the output shaft part 41b is smaller than the outer diameter and the inner diameter of the output cylinder part 41a. The lower-side part of the output shaft part 41b protrudes lower than the protruding cylinder part 13c. Another member to which the driving force of the electric actuator 10 is output is attached to the lower-side part of the output shaft part 41b.

When the motor shaft 21 is made to rotate around the central axis J1, the eccentric axis part 21a revolves in the circumferential direction with the central axis J1 as the center. The revolution of the eccentric axis part 21a is transmitted to the external gear 31 via the first bearing 55, and the external gear 31 swings while its position inscribed in the inner circumferential surfaces of the through holes 31a and the outer circumferential surfaces of the column members 43 changes. Thus, the position where the gear part of the external gear 31 and the gear part of the internal gear 33 engage with each other changes in the circumferential direction. Therefore, the rotational force of the motor shaft 21 is transmitted to the internal gear 33 via the external gear 31.

Here, in the embodiment, since the internal gear 33 is fixed to the cup member 16, it does not rotate. Therefore, the external gear 31 is rotated around the eccentric axis J2 by the reaction force of the rotational force transmitted to the internal gear 33. At this time, the rotation direction of the external gear 31 is opposite to the rotation direction of the motor shaft 21. The rotation of the external gear 31 around the eccentric axis J2 is transmitted to the output flange part 42 via the through holes 31a and the column members 43. Thus, the output shaft 41 rotates around the central axis J1. Therefore, the rotation of the motor shaft 21 is transmitted to the output shaft 41 via the deceleration mechanism 30.

The rotation of the output shaft 41 is decelerated by the deceleration mechanism 30 with respect to the rotation of the motor shaft 21. Specifically, in the configuration of the deceleration mechanism 30 of the embodiment, a deceleration ratio R of the rotation of the output shaft 41 with respect to the rotation of the motor shaft 21 is represented by $R=-(N2-N1)/N1$. The negative sign at the beginning of the equation representing the deceleration ratio R indicates that the rotation direction of the output shaft 41 to be decelerated is opposite to the rotation direction of the motor shaft 21. N1 is the teeth number of the external gear 31, and N2 is the teeth number of the internal gear 33. As an example, when the teeth number N1 of the external gear 31 is 59 and the teeth number N2 of the internal gear 33 is 60, the deceleration ratio R is $-1/59$.

Thus, according to the deceleration mechanism 30 of the embodiment, the deceleration ratio R of the rotation of the output shaft 41 with respect to the rotation of the motor shaft 21 can be made relatively large. Therefore, the rotational torque of the output shaft 41 can be made relatively large.

The wiring member 90 is electrically connected to the first rotation sensor 61 (to be described later) of the rotation detection device 60. In the embodiment, the wiring member 90 is a member for connecting the first rotation sensor 61 and the control board 71 of the control part 70. In the embodiment, the wiring member 90 is an elongated plate-shaped bus bar. As shown in FIG. 2, in the embodiment, three wiring members 90 are provided. Each of the wiring members 90 is configured by connecting a first wiring member 91 and a second wiring member 92.

The first wiring member 91 extends from the inner part of the second wiring holding part 15 to the inner part of the control board accommodating part 12f. A part of the first wiring member 91 is embedded in the first wiring holding part 14, the case cylinder part 12a and the wall part body 12i. In this way, the first wiring member 91 is held by the motor case 12.

The lower end part of the first wiring member 91 protrudes from the first wiring holding part 14 to the lower side and is located in the inner part of the second wiring holding part 15. The upper end part of the first wiring member 91 protrudes from the wall part body 12i to the upper side and is connected to the control board 71. In this way, the first wiring member 91 is electrically connected to the control board 71 and electrically connected to the electrical wiring outside the case 11 via the connector part 80.

A part of the second wiring member 92 is embedded in the bottom part of the case body 13i. In this way, the second wiring member 92 is held by the deceleration mechanism case 13. The upper end part of the second wiring member 92 protrudes from the bottom wall part 15a toward the upper side. The upper end part of the second wiring member 92 is connected to the lower end part of the first wiring member 91. The lower end part of the second wiring member 92 penetrates the bottom part of the case body 13i and protrudes to the inner part of the concavity 17. The lower end part of the second wiring member 92 corresponds to one end part of the wiring member 90. Therefore, the wiring member 90 penetrates the case 11 from the inner part of the case 11, and one end part thereof protrudes to the inner part of the concavity 17.

The rotation detection device 60 detects the rotation of the output part 40. The rotation detection device 60 includes the first magnet 63 and the first rotation sensor 61. The first magnet 63 is in an annular shape with the central axis J1 as the center. The first magnet 63 is attached to the output part 40. The first magnet 63 is located on the lower side of the bottom surface of the output flange part 42. The lower-side end part of the first magnet 63 faces the upper side of the ring plate part 16b with a gap therebetween.

The first rotation sensor 61 is located in the inner part of the concavity 17. The first rotation sensor 61 is located on the lower side of the first magnet 63 with the ring plate part 16b interposed therebetween. The first rotation sensor 61 is disposed in the recessed part 16h of the ring plate part 16b. The first rotation sensor 61 is a magnetic sensor that detects the magnetic field generated by the first magnet 63. The first rotation sensor 61 is, for example, a Hall element. The first rotation sensor 61 can detect the rotation of the output part 40 by detecting the change of the magnetic field generated by the first magnet 63 which rotates together with the output part 40. Here, according to the embodiment, the cup member 16 is a nonmagnetic material. Therefore, even if the cup member 16 is located between the first magnet 63 and the first rotation sensor 61, the detection accuracy of the magnetic field of the first magnet 63 by the first rotation sensor 61 can be suppressed from lowering.

Further, the rotation detection device 60 may include a covering part (not shown). Though not particularly shown in the drawings, the covering part is located in the inner part of the concavity 17. The covering part is made of resin and is filled in the inner part of the concavity 17. It is preferable that the lower end part of the second wiring member 92 (that is, one end part of the wiring member 90) and the first rotation sensor 61 are embedded in and covered by the covering part. In this case, moisture or the like can be prevented from contacting the one end part of the wiring member 90 and the first rotation sensor 61 located in the concavity 17.

Further, the disclosure is not limited to the above-described embodiments. For example, as described below, the configuration can be changed in a scope without departing from the spirit of the disclosure.

In the above embodiments, an example in which the gear pressing part 12e of the motor case 12 is in a ring shape with the central axis J1 as the center has been described, but the disclosure is not limited thereto. Though not particularly shown in the drawings, a plurality of gear pressing parts 12e may be disposed on the lower end part of the case cylinder part 12a in the circumferential direction with intervals from one another. In this case, when the motor case 12 is manufactured by resin molding, the positional shift caused by the resin shrinkage of the gear pressing parts 12e can be suppressed. Therefore, the positional accuracy of the internal gear 33 pressed by the gear pressing parts 12e in the axial direction Z is further improved.

In the above embodiments, an example in which the balance concave part 21b of the eccentric axis part 21a is disposed on the end part in the predetermined direction P of the tapered surface part 21c has been described, but the disclosure is not limited thereto. Though not particularly shown in the drawings, the balance concave part 21b may be a groove disposed on the end part in the predetermined direction P of the eccentric axis part 21a. The groove extends in the axial direction Z, for example. In this case, the function of the balance concave part 21b can be easily adjusted by the groove length, groove width, number of grooves, and the like. Further, for example, a function of a keyway and the like can be added to the balance concave part 21b.

Moreover, the use of the electric actuator 10 described in the above embodiments is not limited, and the electric actuator 10 may be mounted on any machine. The electric actuator 10 of the above-described embodiments is mounted on, for example, a vehicle.

In addition, in the scope without departing from the spirit of the disclosure, each configuration (configuring element) described in the above embodiments, modified examples, notes and the like may be combined, and addition, omission, substitution and other changes of each configuration may be made. Further, the disclosure is not limited by the above-described embodiments, but is limited only by the scope of the claims.

What is claimed is:

1. An electric actuator, comprising:
   a motor which comprises:
      a rotor having a motor shaft extending along a central axis; and
      a stator facing the rotor in a radial direction;
   a deceleration mechanism which is disposed on one axial-direction side of the stator and connected to the motor shaft;
   an output shaft which is disposed on the one axial-direction side of the deceleration mechanism, which extends in an axial direction, to which rotation of the motor shaft is transmitted via the deceleration mechanism, and which rotates around the central axis;

a first bearing which is attached to the motor shaft;
a second bearing which is fitted on a radial-direction outer side of the output shaft; and
a deceleration mechanism case in which a part of the motor shaft, the deceleration mechanism, a part of the output shaft, the first bearing and the second bearing are accommodated,
wherein the motor shaft comprises an eccentric axis part with an eccentric axis, which is eccentric with respect to the central axis, as a center,
the first bearing is fitted on the radial-direction outer side of the eccentric axis part,
the deceleration mechanism comprises:
an internal gear in a ring shape;
an external gear which is connected to the eccentric axis part via the first bearing, which is disposed on a radial-direction inner side of the internal gear, and which engages with the internal gear; and
an output flange part which is disposed on the one axial-direction side of the external gear, which is connected to the external gear, and which transmits rotation of the external gear around the central axis to the output shaft,
the deceleration mechanism case comprises:
a case body; and
a cup member which is a single member made of metal, which is fixed to the case body, and which is in a cylindrical shape with the central axis as a center, and
the cup member comprises:
a first cylinder part to which the internal gear is fitted on the radial-direction inner side; and
a second cylinder part which is disposed on the one axial-direction side of the first cylinder part and to which the second bearing is fitted on the radial-direction inner side.

2. The electric actuator according to claim 1, comprising a third bearing which is fitted on the radial-direction outer side of an end part of the motor shaft on the one axial-direction side,
wherein the output shaft comprises:
an output cylinder part which is connected to the output flange part, which is in a cylindrical shape extending in the axial direction, and to which the third bearing is fitted on the radial-direction inner side; and
an output axis part which extends from the output cylinder part to the one axial-direction side.

3. The electric actuator according to claim 1, wherein the case body is made of resin, and
a part of the cup member is embedded in the case body.

4. The electric actuator according to claim 2, wherein the case body is made of resin, and
a part of the cup member is embedded in the case body.

5. The electric actuator according to claim 1, wherein the first cylinder part comprises, on an inner circumferential surface of the first cylinder part, a first fitting part which is exposed to the radial-direction inner side and to which the internal gear is fitted, and
the second cylinder part comprises, on an inner circumferential surface of the second cylinder part, a second fitting part which is exposed to the radial-direction inner side and to which the second bearing is fitted.

6. The electric actuator according to claim 2, wherein the first cylinder part comprises, on an inner circumferential surface of the first cylinder part, a first fitting part which is exposed to the radial-direction inner side and to which the internal gear is fitted, and
the second cylinder part comprises, on an inner circumferential surface of the second cylinder part, a second fitting part which is exposed to the radial-direction inner side and to which the second bearing is fitted.

7. The electric actuator according to claim 1, wherein the first cylinder part comprises a concave part which is recessed from an inner circumferential surface of the first cylinder part toward the radial-direction outer side, and
the internal gear comprises a convex part which protrudes from an outer circumferential surface of the internal gear toward the radial-direction outer side and which is disposed in the concave part.

8. The electric actuator according to claim 1, wherein a diameter of the first cylinder part is greater than a diameter of the second cylinder part, and
the cup member comprises a ring plate part which comprises a pair of plate surfaces facing the axial direction and which is connected to an end part of the first cylinder part on the one axial-direction side and an end part of the second cylinder part on the other axial-direction side.

9. The electric actuator according to claim 8, wherein the ring plate part comprises a recessed part which is recessed from the plate surface of the ring plate part in the axial direction.

10. The electric actuator according to claim 8, wherein the ring plate part comprises a connecting hole which penetrates the ring plate part in the axial direction,
the case body is made of resin, and
a part of the case body is disposed in the connecting hole.

* * * * *